M. MATHIESEN.
SPRING WHEEL.
APPLICATION FILED OCT. 16, 1920.
1,367,917.
Patented Feb. 8, 1921.
2 SHEETS—SHEET 1.
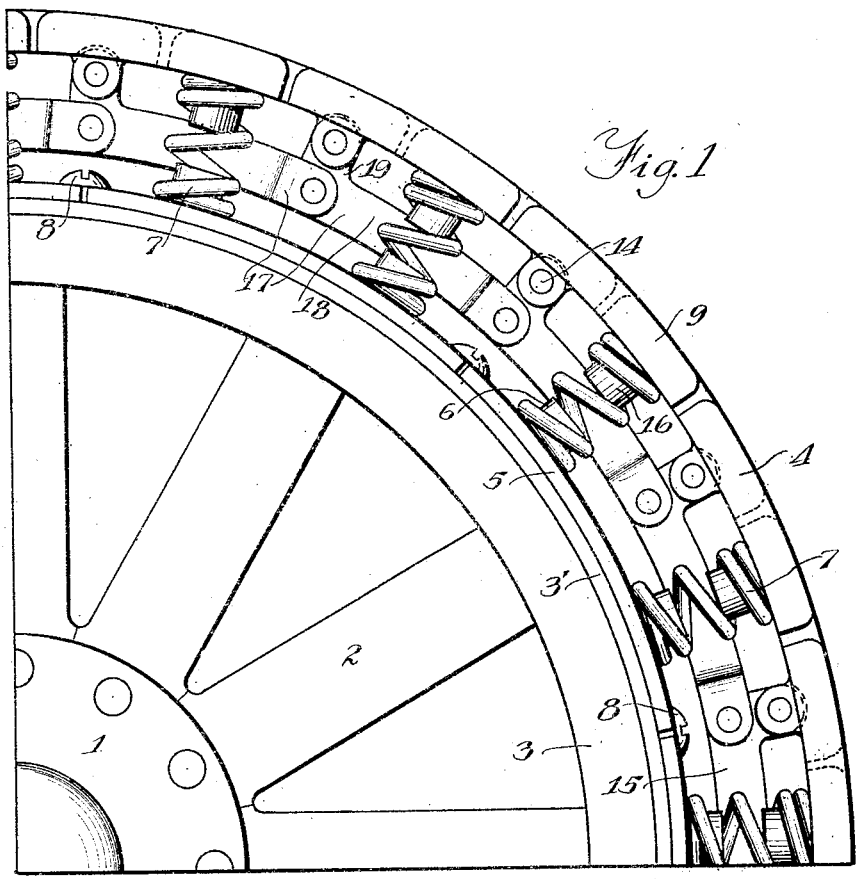
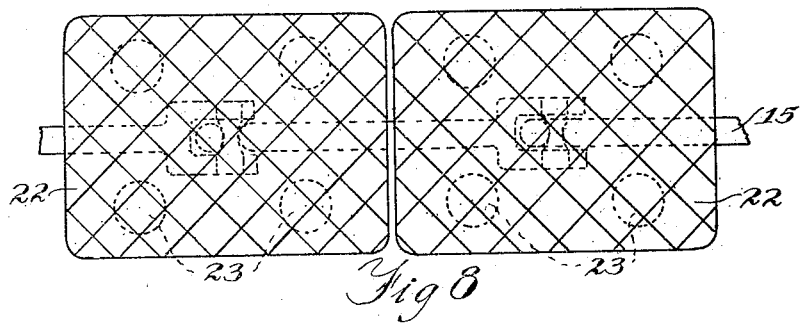

M. MATHIESEN.
SPRING WHEEL.
APPLICATION FILED OCT. 16, 1920.
1,367,917.
Patented Feb. 8, 1921.
2 SHEETS—SHEET 2.
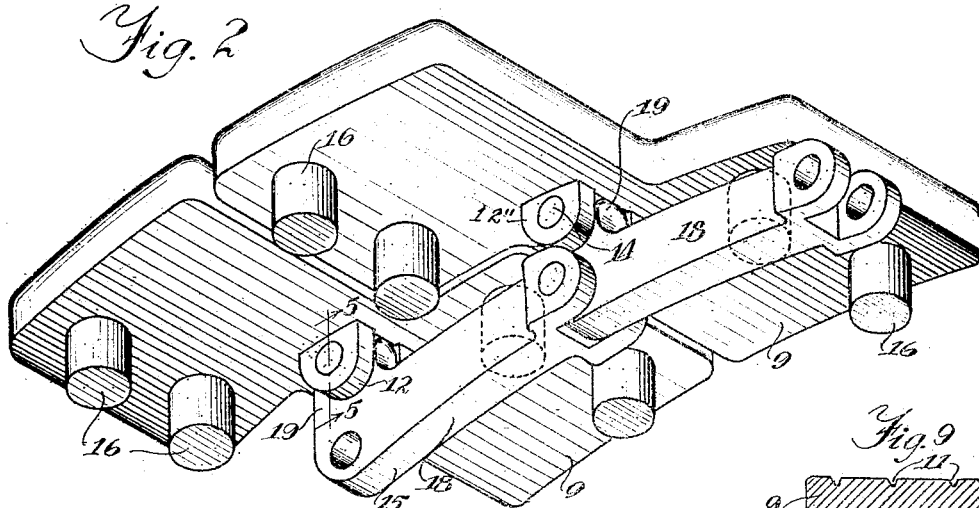
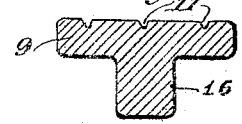
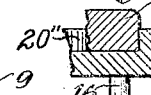
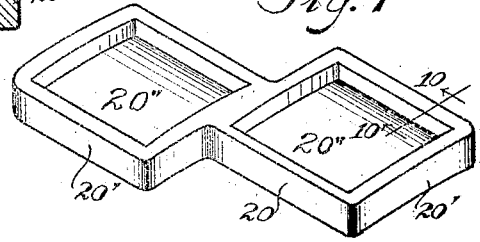
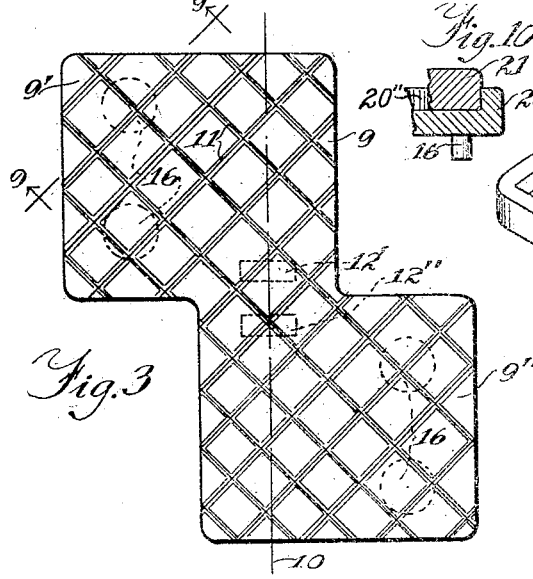
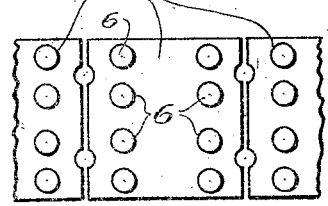
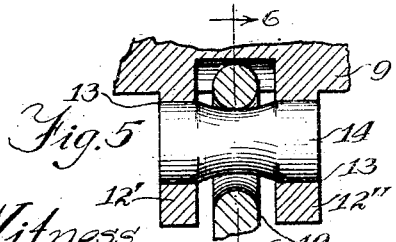
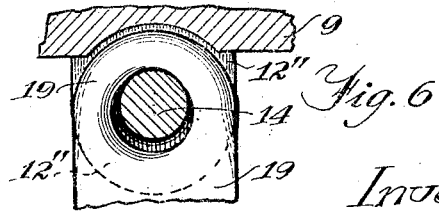
Witness
George C. Schultz
Inventor,
By Marius Mathiesen,
Kummler & Kummler, Att'ys

UNITED STATES PATENT OFFICE.

MARIUS MATHIESEN, OF CHICAGO, ILLINOIS, ASSIGNOR OF ONE-HALF TO FRANK E. SHORTESS, OF CHICAGO, ILLINOIS.

SPRING-WHEEL.

1,367,917.  Specification of Letters Patent.  Patented Feb. 8, 1921.

Application filed October 16, 1920. Serial No. 417,532.

*To all whom it may concern:*

Be it known that I, MARIUS MATHIESEN, a citizen of the United States of America, and a resident of Chicago, county of Cook, and State of Illinois, have invented certain new and useful Improvements in Spring-Wheels, of which the following is a specification.

This invention relates to spring wheels of the rigid body type provided with a yielding tread member or tire, as opposed to the floating hub type. Heretofore wheels have been made with tread shoes flexibly connected and yieldingly mounted on the wheel body, but such wheels have usually been complicated in construction and expensive to manufacture and maintain.

The main objects of this invention are to provide an improved form of yielding wheel tire or tread of sectional character, and particularly an improved form of tread shoe and means for yieldingly mounting and connecting same for use.

An illustrative embodiment of the invention is shown in the accompanying drawings, in which—

Figure 1 is a side elevation of one quadrant or section of the wheel.

Fig. 2 is a perspective view of the inner side of a pair of demountable tire shoes and their attaching means, said shoes being a modification of those shown in side elevation on the wheel of Fig. 1, and illustrating how the two lobes, front and rear, may be formed in reverse position respecting the peripheral center line of the tire.

Fig. 3 is an outer face plan of a shoe such as shown in Figs. 1 and 2.

Fig. 4 is a face view of a series of felly plates, the edges of which are shown in Fig. 1, developed in a plane.

Fig. 5 is a section on the line 5—5 of Fig. 2 through the shoe pivot.

Fig. 6 is a section on the line 6—6 of Fig. 5.

Fig. 7 is a perspective view of the outer face of the frame of another form of shoe.

Fig. 8 is a face view of a pair of demountable tire shoes of still another form.

Fig. 9 is a section at 9—9 on Fig. 3.

Fig. 10 is a fragmentary section on the line 10—10 of Fig. 7.

In the embodiment shown in the drawings, the wheel body may be of the usual rigid construction, comprising a hub 1, spokes 2, and felly 3 provided with a felly band 3', all permanently joined together in fixed relation. The wheel body is formed and adapted on the outer face of the felly 3 to receive the support of the yielding tread rim or multiple shoe tire 4 hereinafter more fully described. For this purpose the felly is provided, on the outward face of its band 3, with a series of bearing members or guide plates 5, preferably made of sheet metal and provided with outstanding studs 6 adapted to receive the inner ends of suitable yielding means such as helical springs 7. (See Fig. 1.) Said plates are secured to the felly by suitable rigid fastenings, such as screws 8 or the like. The tread shoes 9 included in the tire 4 may be formed and arranged in different ways as will be explained, but are in each instance arranged in limited spaced relation peripherally so as to accommodate substantially free and independent movement in response to irregularities in the road-bed.

In the form shown in Fig. 1 the tread shoes 9 are formed and arranged to overlap one another laterally, each shoe, however being formed in this instance to extend the full width of the tire. (See Figs. 2 and 3.) For this puropse each shoe, which may be in the form of a metal casting, comprises a pair of lobes 9' and 9" disposed on opposite sides of the peripheral center line of the tread rim, one lobe extending forwardly and the other backwardly from the transverse center line 10 of the shoe, (see Fig. 3), said lobes preferably being of like size and rectangular shape, with corrugations or grooves 11 in their tread surfaces to better grip the road-bed. Each of said shoes is provided centrally with downwardly projecting means 12 preferably in the form of spaced lugs or arms 12' and 12" which are transversely perforated in alinement at their projecting ends as at 13, to receive a pivot member 14, whereby it may be secured to corresponding upstanding lugs or arms on the tire chain 15 hereinafter described. The shoe 9 is in balance respecting the lug 12, being substantially symmetrical in relation thereto. Inwardly facing lugs 16 are provided on the inner faces of said shoes to register with the felly plate lugs 6 above mentioned, for securing the springs 7 in place, said lugs being received by the opposite ends of said springs respectively in coaxial alinement. In order to prevent tipping or lateral bending of the springs they are formed to seat squarely on their ends against the plates 5 and shoes 9, and the studs 6 and 16 project well into the ends and fit snugly therein. Moreover, the springs are heavy and stiff enough to strongly oppose lateral bending.

In order to secure the shoes together yieldingly on definitely spaced centers, the chain 15 is formed to comprise a series of links 17 of angular shape disposed in a plane perpendicular to the wheel axis and with one arm 18 formed relatively long extending peripherally of the tire and with its short arm 19 standing outward radially in the form of a lug, whereon the corresponding shoes 9 are mounted.

When the wheel is assembled, the chain 15 is held in tension by the outward stress of the springs 7 which serve to hold the shoes in uniform relation so long as no external forces are brought to bear on the wheel. In operation, however, the weight of the load on the wheel rolling along the road-bed overcomes to a greater or less degree the expansive force of the downwardly acting springs, especially in running over such smaller obstacles as pebbles and small stones, and the active part of the tire, that is to say, the instant bearing shoe, or group of two or three shoes, is forced upward somewhat. By reason of the said chain and the coacting springs disposed as stated, the weight is distributed over a relatively large part of the lower half of the wheel periphery, so that when the wheel encounters any slight obstruction in the road, the corresponding shoe or part of the tread rim is depressed sufficiently to permit the wheel to pass without materially affecting the general rectilinear movement of the wheel as a whole.

The pivotal connection 14–12 for the lever arm 19 is formed to provide ample clearance space on all sides of the perforated tip of arm 19, so as to give plenty of room for free play of the shoe as it is caused to rock about somewhat in various directions corresponding to chance irregularities in the road-bed. The pivot pin 14 fits snugly in the perforations 13, but is readily removable and interchangeable to facilitate interchanging and renewing the shoes. Said pin 14 is beveled inward somewhat at the center where the loose fitting arm 19 takes its bearing so that the outward tension of said arm, urged by the spring 7, will tend to lock the pivot in place and prevent accidental withdrawal when the wheel is in use.

The arms 18 are pivotally connected, being forked at one end and merely perforated at the other end, and the forks being provided each with a pivot to fit in the end of the next adjacent link.

In the form of shoe 20 illustrated in Figs. 7 and 10, each lobe 20' is provided on its outward face with a depression 20", adapted to receive interchangeable wear blocks 21, which blocks may be made of wood or other suitable material and may be secured in place by any convenient means, or they may be formed of material suitable for mounting, molding, or vulcanizing in place, rubber being adapted for the latter purpose. Otherwise the shoes 20 may be similar in form and character to those shown in Fig. 2.

In the form shown in Fig. 8, the tread rim comprises a series of rectangular shoes 22 arranged in peripheral series, mounted on a chain as above described. Said shoes 22 are provided with studs 23 corresponding substantially with studs 16 of Fig. 2, for coaction with suitable springs substantially as above described. Said shoes 22 are also provided with lugs similar to those on the above-mentioned shoes 9 for mounting on the chain 15.

The forms shown in Figs. 2 and 7 are especially adapted for heavy trucks, though they may be made light and adapted for passenger vehicles if desired. The form shown in Fig. 8, however, is comparatively narrow and is best adapted for the lighter wheels of runabouts and light weight automobiles.

Although only a few of the most useful forms of embodiment of this invention are herein shown and described, it is to be understood that numerous details of the constructions shown and described may be altered or omitted without departing from the spirit of this invention as defined by the following claims.

I claim:

1. A wheel, comprising a rigid body and a yielding tread member, said tread member comprising a series of shoes disposed about the periphery of the wheel in sufficiently spaced relation for mutual direct independence of movement, a chain disposed between the wheel body and said shoes and including a series of links, said links having outwardly projecting means whereon the shoes are centrally mounted, and outwardly acting yielding means disposed between said wheel body and opposite ends of said shoes respectively.

2. In a wheel, a chain comprising a series of links each provided with an outstanding arm, a tread shoe mounted pivotally on said arm, and outwardly acting resilient means disposed between the wheel body and said shoe on opposite sides of said arm.

3. A wheel of the character described, comprising a tread shoe having on its inner side a central bearing part, and a coacting support member for said shoe formed and adapted for limited freedom of mutual movement for tilting of the shoe in any direction, said bearing part comprising a pair of arms spaced apart with a medially restricted longitudinally removable pivot member connecting said arms, and said support member being perforated to receive said pivot member and fitting loosely between said arms, and said shoe being formed and adapted at a plurality of points on opposite sides of said bearing part to engage yielding supports.

4. In a wheel, a series of tread shoes each adapted for pivotal mounting and having centrally disposed on its inner side a pair of arms which are perforated in registry, a pivot for said arms, tension means for connecting the pivots of adjacent shoes, and outwardly acting resilient means disposed between the wheel body and said shoes in coactive relation thereto.

5. In a wheel, a series of tread shoes each adapted for pivotal mounting and having centrally disposed on its inner side a pair of arms which are perforated in registry, a pivot for said arms, tension means for connecting the pivots of adjacent shoes, and outwardly acting resilient means disposed between the whole body and said shoes in coactive relation thereto, said tension means being in the form of a chain, the links of which are provided each with an outstanding arm perforated to receive said pivot, and said pivot being beveled medially, whereby it is retained in place by the pressure thereon of the respective link due to the action of said resilient means.

6. In a spring wheel, a chain comprising a series of angular links disposed in a plane perpendicular to the wheel axis with one arm of each link projecting outward and connected to the tread member.

Signed at Chicago this 14th day of October, 1920.

MARIUS MATHIESEN.

It is hereby certified that in Letters Patent No. 1,367,917, granted February 8, 1921, upon the application of Marius Mathiesen, of Chicago, Illinois, for an improvement in "Spring-Wheels," an error appears in the printed specification requiring correction as follows: Page 3, line 25, claim 5, for the word "whole" read *wheel;* and that the said Letters Patent should be read with this correction therein that the same may conform to the record of the case in the Patent Office.

Signed and sealed this 8th day of March, A. D., 1921.

[SEAL.]

M. H. COULSTON,

*Commissioner of Patents.*

Cl. 152—8.